(12) United States Patent
Sakuma

(10) Patent No.: US 9,332,816 B2
(45) Date of Patent: May 10, 2016

(54) ARTICLE HANGER

(71) Applicant: SUGATSUNE KOGYO CO., LTD., Chiyoda-ku, Tokyo (JP)

(72) Inventor: Kentaro Sakuma, Chiyoda-ku (JP)

(73) Assignee: SUGATSUNE KOGYO CO., LTD., Chiyoda-Ku (JP)

( * ) Notice: Subject to any disclaimer, the term of this patent is extended or adjusted under 35 U.S.C. 154(b) by 0 days.

(21) Appl. No.: 14/395,438

(22) PCT Filed: Apr. 12, 2013

(86) PCT No.: PCT/JP2013/061016
§ 371 (c)(1),
(2) Date: Oct. 17, 2014

(87) PCT Pub. No.: WO2013/157489
PCT Pub. Date: Oct. 24, 2013

(65) Prior Publication Data
US 2015/0069206 A1  Mar. 12, 2015

(30) Foreign Application Priority Data

Apr. 17, 2012  (JP) ................ 2012-093659

(51) Int. Cl.
| | | |
|---|---|---|
| *F16B 45/00* | (2006.01) | |
| *A45C 13/18* | (2006.01) | |
| *A47G 25/06* | (2006.01) | |
| *F16B 45/02* | (2006.01) | |
| *F16M 13/02* | (2006.01) | |
| *A47G 1/20* | (2006.01) | |

(52) U.S. Cl.
CPC ............ *A45C 13/18* (2013.01); *A47G 25/0607* (2013.01); *F16B 45/02* (2013.01); *F16M 13/02* (2013.01); *A47G 2001/207* (2013.01)

(58) Field of Classification Search
USPC .......... 248/304, 305, 306, 339, 551, 552, 914
See application file for complete search history.

(56) References Cited

U.S. PATENT DOCUMENTS

| | | | | |
|---|---|---|---|---|
| 545,680 | A | * 9/1895 | Colbert, Jr. ............. | F16G 15/06 24/581.12 |
| 4,095,316 | A | * 6/1978 | Gabriel ................... | F16B 45/02 226/200 |
| 5,577,304 | A | * 11/1996 | Simond ................... | F16B 45/02 24/588.1 |
| 6,227,015 | B1 | * 5/2001 | Luquire ................ | E05B 37/025 24/598.1 |
| 8,474,112 | B2 | * 7/2013 | Thompson .............. | F16B 45/02 24/582.11 |
| D735,019 | S | * 7/2015 | Thomas .......................... | D8/356 |
| D735,559 | S | * 8/2015 | Liang .............................. | D8/356 |
| 2008/0104810 | A1 | * 5/2008 | Liang ..................... | F16B 45/02 24/600.2 |

FOREIGN PATENT DOCUMENTS

| | | |
|---|---|---|
| JP | 7-13579 Y2 | 4/1995 |
| JP | 11-004738 A | 1/1999 |

\* cited by examiner

*Primary Examiner* — Steven Marsh
(74) *Attorney, Agent, or Firm* — Masuvalley & Partners

(57) ABSTRACT

The upper end of a cover is provided at the upper end of a hanger body so as to be capable of rotating in the vertical direction. The cover is adapted to be capable of rotating between a closed position at which the cover abuts on the front surface of the hook of the hanger body and an open position at which the cover is rotated upward by a predetermined angle from the closed position. When located at the closed position, the cover closes an upper open section which opens an engagement recess to the outside. An insertion hole (is provided in the cover. The latch of a padlock is inserted through both the insertion hole and the engagement recess. The abutting of the latch against the backward facing back surface of the hook prevents the cover from rotating from the closed position to the open position side.

10 Claims, 19 Drawing Sheets

ARTICLE HANGER

CROSS-REFERENCE TO RELATED APPLICATIONS

This application is the national phase entry under 35 U.S.C. §371 of International Application No. PCT/JP2013/061016, filed on Apr. 12, 2013, which claims priority under 35 U.S.C. §119 to Japanese Patent Application No. JP2012-093659, filed on Apr. 17, 2012, the contents of which are hereby incorporated by reference in their entirety for all purposes.

TECHNICAL FIELD

The present invention relates to an article hanger used when hanging and suspending a strap portion of a handbag or the like, and more particularly to an article hanger suitable for use in suspending a product.

BACKGROUND OF THE INVENTION

Generally, as described in the following Patent Document 1 (Japanese Examined Utility Model Application Publication No. H7-13579), this type of article hanger has a hanger body that is attached to a building frame such as a wall. A hook that extends forward from the hanger body and then extends upward is provided at a lower part of the front surface of the hanger body. An engagement recess having both left and right edge parts and an upper part opened is formed by this hook and a front surface of the hanger body that faces the hook. An upper open section having the engagement recess open to the outside is also provided at an upper side of the engagement recess thereof. The strap portion of a handbag is inserted from this upper open section, and is supported by the hook. Through this, the handbag is suspended by the article hanger.

An upper end of an opening/closing member is provided at an upper part of the hanger body so as to be rotatable centered on a horizontal axial line. The opening/closing member is rotatable between a blocking position where a lower end of the opening/closing member abuts an upper end of the hook, thereby closing the upper open section, and an open position where the lower end separates rearward from the hook, thereby opening the upper open section. A rotational biasing means such as a coil spring is provided between the opening/closing member and the hanger body. The rotational biasing means biases the opening/closing member from the open position to the blocking position, and maintains the opening/closing member at the blocking position.

With the article hanger described in the above Patent Document 1, the opening/closing member opposes the biasing force of the rotational biasing means, and is capable of easily rotating. As a result, when the above-described conventional article hanger is used to display a product, a risk of the product being stolen exists.

SUMMARY OF THE INVENTION

In order to solve the above-described problem, the embodiments of the present invention provides an article hanger with a hanger body attachable to a building frame such as a wall; a hook provided as a portion of the hanger body in a front surface of the hanger body, the hook having an upper end separated in a forward direction from the front surface of the hanger body; an engagement recess formed by the hook and the front surface of the hanger body, the engagement recess having a lower portion that is closed, and both right and left side parts that are opened; and an upper open section which opens an upper portion of the engagement recess to an outside, the upper open section being formed above the upper end of the hook.

The article hanger including: an anti-theft member having one end provided at the hanger body so as to be rotatable around an axial line of rotation, the anti-theft member being capable of rotating between a closed position, where the engagement recess is closed with respect to the outside, and an opened position, where the engagement recess is opened to the outside via the upper open section; and an insertion hole into which a latch of a padlock (J) is inserted, the insertion hole being formed on the anti-theft member, and the insertion hole being arranged such that rotation of the anti-theft member from the closed position to the opened position side is prevented by the inserted latch abutting the hanger body.

In this case, one end in a vertical direction of the anti-theft member is provided so as to be rotatable at the hanger body, and when the anti-theft member is positioned in the closed position, the upper open section is preferably closed, thereby closing the engagement recess with respect to the outside, and when the anti-theft member is positioned in the opened position, the upper open section is preferably opened, thereby opening the engagement recess via the upper open section with respect to the outside via the upper open section.

When the anti-theft member is positioned in the opened position, an other end of the anti-theft member preferably separates in a forward direction from the hanger body, thereby opening the upper open section, and when the anti-theft member rotates to the closed position such that the other end of the anti-theft member moves toward the hanger body, the anti-theft member preferably covers the upper open section, thereby closing the upper open section. An upper end of the anti-theft member is preferably rotatably provided at the hanger body such that a lower end of the anti-theft member moves approaching and separating in a front-back direction with respect to the hanger body.

The insertion hole is preferably arranged such that when an attempt is made to rotate the anti-theft member from the closed position to the opened position side, the latch inserted into the insertion hole abuts an inner surface facing the engagement recess of the hook, and rotation of the anti-theft member from the closed position to the opened position side is preferably prevented by the latch abutting the inner surface facing the engagement recess of the hook. An upper end of the opening/closing member is preferably provided so as to be rotatable centered on a horizontal axial line at the hanger body, wherein the opening/closing member is capable of rotating between a blocking position where a lower end of the opening/closing member abuts from a rear side of the upper end of the hook, thereby closing the upper open section, and an open position where the lower end separates rearward from the hook, thereby opening the upper open section; and a rotational biasing means for rotationally biasing the opening/closing member from the open position side to the blocking position side and maintaining the opening/closing member at the blocking position is provided between the hanger body and the opening/closing member.

The anti-theft member preferably includes a main plate part opposing the upper open section and the hook in the front-back direction when the anti-theft member is positioned at the closed position; and a side plate part is preferably formed on at least one of both a right and a left side part of the main plate, the side plate part projecting rearward so as to pass both a right and a left side part of the hook toward the rear when the anti-theft member is positioned at the closed position, a tip end part of the projection direction opposing the engagement recess in a right-left direction, and the insertion hole being formed at the tip end part of the side plate part.

An upper end of an opening/closing member is preferably provided so as to be rotatable centered on a horizontal axial line at the hanger body, wherein the opening/closing member is capable of rotating between a blocking position where a lower end of the opening/closing member abuts from a rear side of the upper end of the hook, thereby closing the upper open section, and an open position where the lower end separates rearward from the hook, thereby opening the upper open section, and a rotational biasing means for rotationally biasing the opening/closing member from the open position side to the blocking position side and maintaining the opening/closing member at the blocking position is preferably provided between the hanger body and the opening/closing member.

The side plate parts are preferably formed respectively on both right and left side parts of the main plate part, and when the anti-theft member is positioned in the closed position, the hook and the opening/closing member positioned in the blocking position are covered from the forward direction and from both the right and left sides by the main plate part and the side plate parts. The hanger body preferably further includes a base attachable to the building frame, and a main body part attachable to the base, wherein one end of the anti-theft member is preferably provided at the base so as to be rotatable, and the hook, the engagement recess and the upper open section are preferably provided at the main body part.

The hanger body preferably further includes a base attachable to the building frame, and a main body part attachable to the base; wherein one end of the anti-theft member is preferably provided at the base so as to be rotatable, and the hook, the engagement recess, the upper open section, the opening/closing member and the rotational biasing means are preferably provided at the main body part. A screw insertion hole for inserting a male screw member such as a wood screw to secure the hanger body to the building frame is preferably formed at the hanger body, wherein the screw insertion hole is preferably arranged such that when the anti-theft member is in the closed position, the screw insertion hole is shielded by the anti-theft member.

According to an invention having the above-described characteristic configuration, when the anti-theft member is caused to be positioned in the closed position, the engagement recess is closed with respect to the outside. Accordingly, a strap portion of a handbag or the like that is inserted into the engagement recess cannot be removed from the engagement recess without rotating the anti-theft member from the closed position to the opened position. Moreover, rotation of the anti-theft member from the closed position to the opened position side is prevented by the latch of the lock, which is inserted into the insertion hole, abutting the hanger body. Accordingly, the strap portion or the like cannot be removed from the engagement recess, and therefore theft of a handbag or the like can be reliably prevented.

BRIEF DESCRIPTION OF THE DRAWINGS

The present disclosure is described in conjunction with the appended figures.

Figure 1:
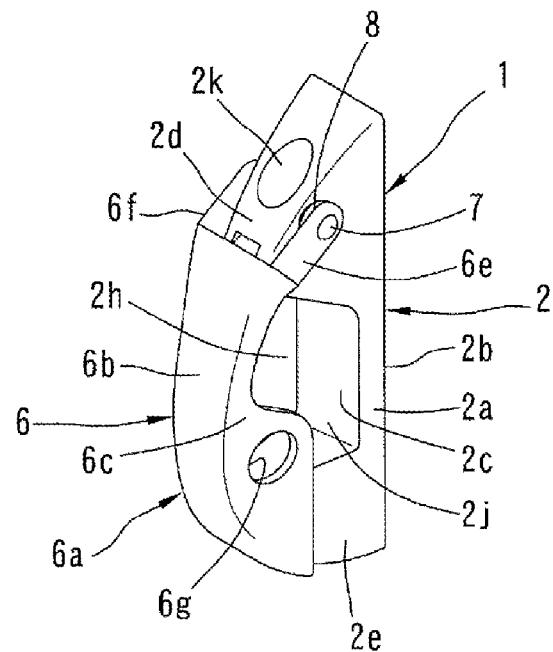
FIG. 1 is a perspective view showing a first embodiment of the present invention in a state with a cover [anti-theft member] positioned in the closed position.

In the appended figures, similar components and/or features may have the same reference label. Further, various components of the same type may be distinguished by following the reference label by a dash and a second label that distinguishes among the similar components. If only the first reference label is used in the specification, the description is applicable to any one the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment(s) of the disclosure. It should be understood that various changes may be made in the function and arrangement of elements without departing from the spirit and scope of the invention as set forth in the appended claims.

FIGS. 1 to 13 show a first embodiment of the present invention. An article hanger 1 of this embodiment has a hanger body 2. The hanger body 2 has a mounting plate 2*a* that forms a flat plate shape. The mounting plate 2*a* is arranged with a longitudinal direction thereof oriented in a vertical direction, and a back surface 2*b* thereof is attached to a vertical wall of a building frame or the like in a state of being pressed against the vertical wall or such.

A projection 2*d* projecting forward is formed integrated with the mounting plate 2*a* at an upper part of a front surface 2*c* of the mounting plate 2*a*, and a hook 2*e* is formed integrated with the mounting plate 2*a* at a lower part of the front surface 2*c* of the mounting plate 2*a*. The hook 2*e* is configured from a support part 2*f* projecting forward from the front surface 2*c* of the mounting plate 2*a*, and an engagement part 2*g* provided integrally with a tip end part of the support part 2*f* thereof, extending upward from the support part 2*f*. The projection 2*d* and the hook 2*e* may also be formed separately from the mounting plate 2*a*, and respectively secured to the mounting plate 2*a*. In either case, the projection 2*d* and the hook 2*e* constitute a portion of the hanger body 2.

By forming the projection 2*d* and the hook 2*e* respectively at the upper part and the lower part of the front surface 2*c* of the mounting plate 2*a*, a recess 2*h* having the front surface 2*c* as its bottom face is formed at a front part of the hanger body 2. The recess 2*h* intersects the hanger body 2 in the right-left direction. Accordingly, both right and left edge parts of the recess 2*h* are open to the outside. Moreover, as shown particularly in FIG. 11, the recess 2*h* opens to the outside in the forward direction via an upper open section 2*i* formed between the projection 2*d* and the upper end of the engagement part 2*g*.

An engagement recess 2*j* is formed at a front lower part of the hanger body 2 by forming the hook 2*e* at a lower part of the front surface 2*c* of the mounting plate 2*a*. The engagement recess 2*j* is formed as a recess having the upper surface of the support part 2*f* as the bottom face, and the lower part of the front surface 2*c* and a rearward facing back surface of the engagement part 2*g* respectively as the side surfaces of the rear side and the front side. The engagement recess 2*j* constitutes the lower part of the recess 2*h* as is clear from the partitioning of the engagement recess 2*j* by the front surface 2*c* and the hook 2*e*. Accordingly, the engagement recess 2*j* opens to the outside in the forward direction via the upper open section 2*i*.

The hook 2*e* is formed in the shape of an "L" by the support part 2*f* and the engagement part 2*g*, but the hook does not necessarily have to be formed in this type of a shape. In place of the hook 2*e*, a hook projecting upward in a slanted manner (slanted to the left and upward in FIG. 11) from the lower part of the front surface 2*c* may also be formed. If this type of hook is formed, an engagement recess having a roughly triangular shape as seen from a side view is formed at a front side lower part of the hanger body 2.

Figure 4:
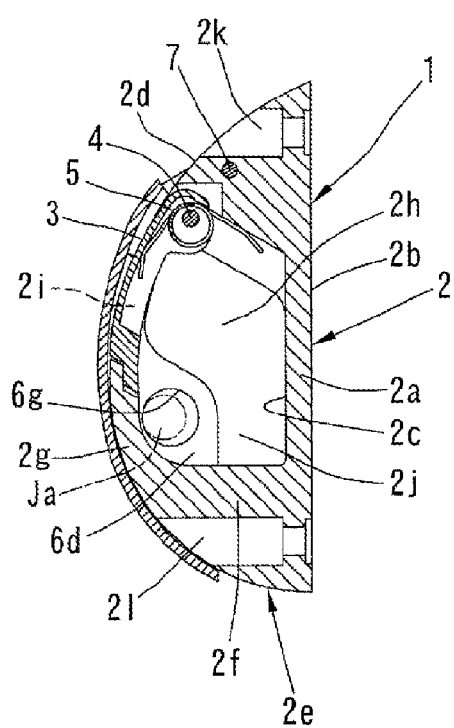
FIG. 4 is a cross-sectional view along the line X-X of FIG. 3.
Figure 5:
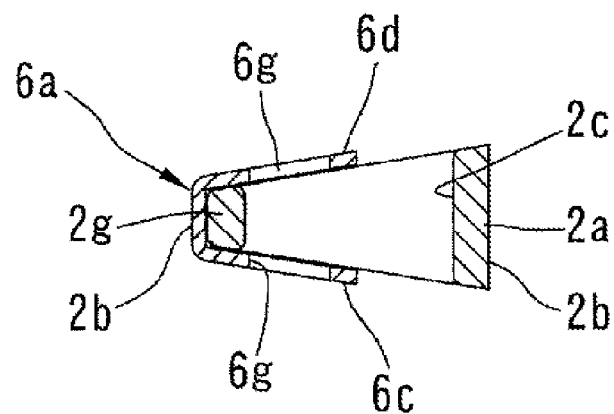
FIG. 5 is a cross-sectional view along the line Y-Y of FIG. 2.
Figure 6:
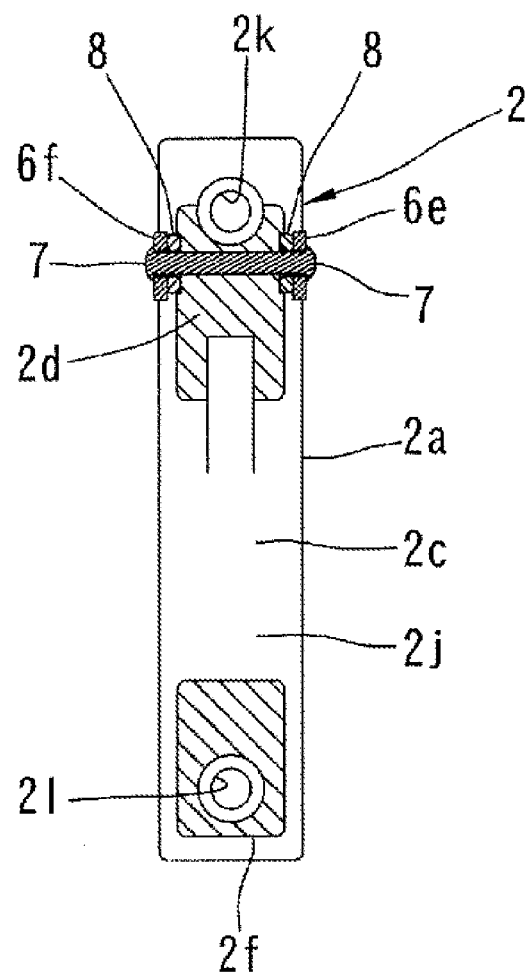
FIG. 6 is a cross-sectional view along the line Z-Z of FIG. 2.
Figure 7:
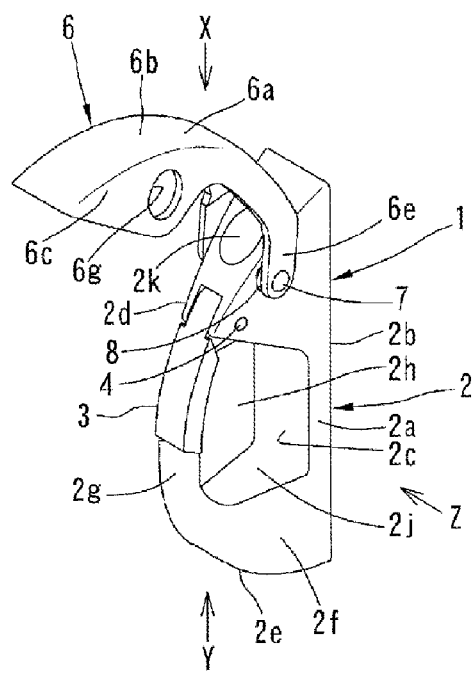
FIG. 7 is a perspective view showing the first embodiment of the present invention in a state with the cover positioned in the opened position.
Figure 8:
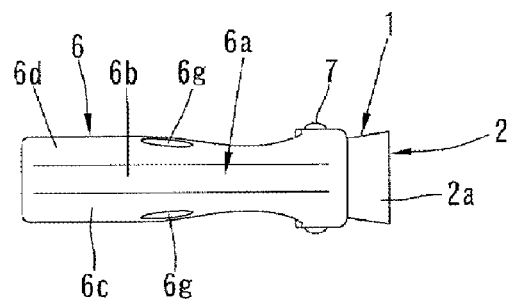
FIG. 8 is a view from the arrow X of FIG. 7.
Figure 9:
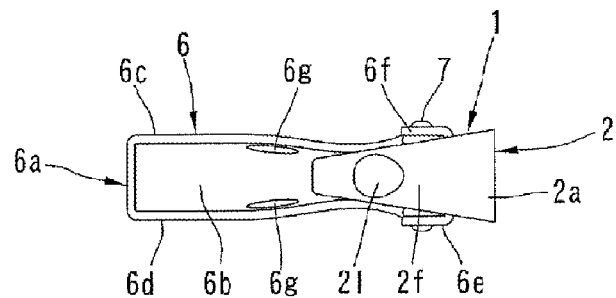
FIG. 9 is a view from the arrow Y of FIG. 7.

As shown in FIG. 4, a screw insertion hole 2*k* extending from a front surface of the projection 2*d* to the back surface 2*b* of the mounting plate 2*a* is formed at an upper part of the hanger body 2. On the other hand, a screw insertion hole 2*l* extending from a front surface of the hook 2*e* to the back surface of the mounting plate 2*a* is formed at a lower part of the hanger body 2. Moreover, the hanger body 2 is secured to a wall or the like so as to be detachable by screwing and tightening wood screws, bolts, or other male screw members for securing (not illustrated) inserted respectively through screw insertion holes 2*k*, 2*l* to a wall or the like. The hanger body 2 may also be secured by adhering the back surface 2*b* thereof to a wall or by another securing means.

At an end part of the front side of the projection 2*d*, an upper end of the opening/closing member 3 is provided so as to be rotatable via a horizontal shaft 4 extending in the right-left direction. The opening/closing member 3 is thereby capable of rotating between a blocking position shown in FIG. 4 and FIG. 10 and an open position shown in FIG. 11.

As the opening/closing member 3 is rotated from the open position in a direction toward the blocking position (clockwise direction in FIG. 11; hereinafter, "closing direction"), when the lower end of the opening/closing member 3 abuts the upper end of the engagement part 2*g*, the opening/closing member 3 is not capable of rotating any further in the closing direction. The rotation position of the opening/closing member 3 at this time is the blocking position. When the opening/closing member 3 is positioned in the blocking position, the upper open section 2*i* is closed by the opening/closing member 3. As a result, the engagement recess 2*j* is blocked with respect to the outside.

As the opening/closing member 3 is rotated from the blocking position in a direction toward the open position (counterclockwise direction in FIG. 4 and FIG. 10; hereinafter "opening direction"), when the lower end of the opening/closing member 3 abuts the front surface 2*c* of the hanger body 2, the opening/closing member 3 is not capable of rotating any further in the opening direction. The position of the opening/closing member 3 at this time is the open position. When the opening/closing member 3 is positioned in the open position, the upper open section 2*i* is opened, and the engagement recess 2*j* is opened to the outside via the upper open section 2*i*.

As shown in FIG. 4, a torsion coil spring (rotational biasing means) 5 is provided between the hanger body 2 and the opening/closing member 3. Through this torsion coil spring 5, the opening/closing member 3 is biased in the closing direction, and is maintained at the blocking position by a prescribed biasing force.

An upper end of a cover (anti-theft member) 6 is provided at the projection 2*d* so as to be rotatable via a horizontal shaft 7 extending in the right-left direction. The cover 6 is capable of rotating between a closed position shown in FIG. 2 and FIG. 4 and an opened position shown in FIG. 10 and FIG. 11. Note that the shaft 7 is disposed further upward than the shaft 4, and is also disposed further rearward than the shaft 4. The shaft 7 may also be disposed at a same position as the shaft 4 in the front-back direction, and if possible, it may also be positioned further forward than the shaft 4.

The cover 6 is made from a plate material, and has a cover body 6*a*. The cover body 6*a* includes a circular arc-shaped plate part (main plate part) 6*b* extending in a circular arc-shape, and a pair of right and left side plate parts 6*c*, 6*d* integrally formed with both right and left side parts of the circular arc-shaped plate part 6*b*, and is formed with a "U"-shaped cross-section. When the cover body 6*a* is positioned in a closed position, an open part thereof is arranged so as to face the hanger body 2 side.

Connection arm units 6*e*, 6*f* are formed respectively at upper ends of the side plate parts 6*c*, 6*d*, or more specifically, at the upper ends of the side plate parts 6*c*, 6*d* when the cover 6 is positioned in the closed position. The connection arm units 6*e*, 6*f* extend in nearly the same direction as a tangential direction at an upper end of the circular arc-shaped plate part 6*b*. The upper ends of the connection arm units 6*e*, 6*f* are connected to the projection 2*d* so as to be rotatable via the horizontal shaft 7 extending in the right-left direction.

When the cover 6 is rotated from the opened position shown in FIG. 10 to a prescribed position in a counterclockwise direction (hereinafter, "closing direction"), as shown in FIG. 4, the circular arc-shaped plate part 6*b* abuts the front surface of the engagement part 2*g* of the hook 2*e*, and the cover 6 is unable to rotate any further in this direction. The rotation position of the cover 6 at this time is the closed position.

Figure 2:
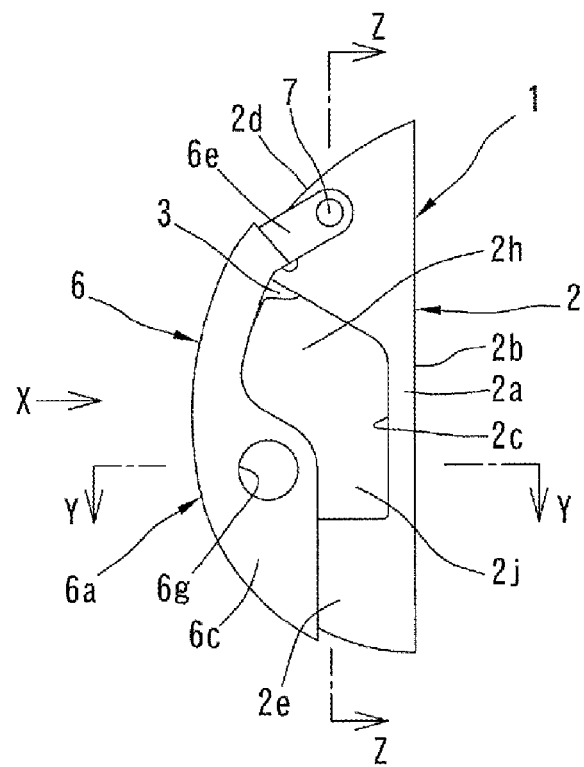
FIG. 2 is a side view of the embodiment shown in FIG. 1.
Figure 3:
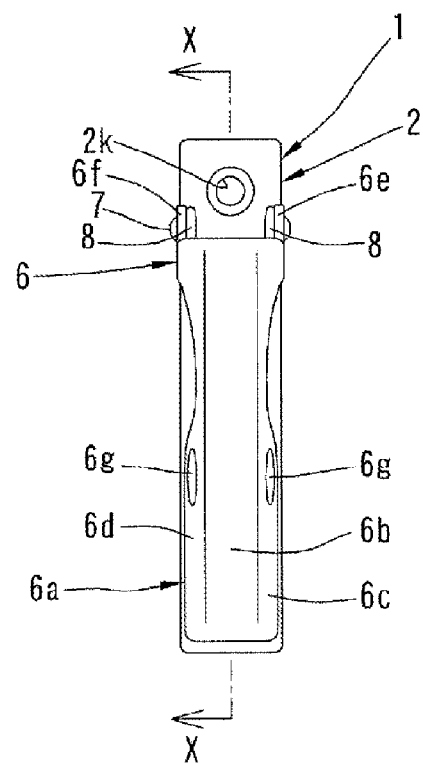
FIG. 3 is a view from the arrow X of FIG. 2.

When the cover 6 is in a state of being positioned in the closed position, the tip end part of the projection 2*d*, the engagement part 2*g* of the hook 2*e*, and nearly all of the opening/closing member 3 (a majority of the opening/closing member 3 excluding the portion illustrated in FIG. 2) enters the inside of the cover 6. As a result, the engagement part 2*g* and the opening/closing member 3 are covered by the circular arc-shaped plate part 6*b* and the side plate parts 6*c*, 6*d* of the cover 6 such that they are not visible from the front direction and the horizontal direction. As is clear from the covering of the opening/closing member 3 by the cover 6, when the cover 6 is positioned in the closed position, even if the opening/closing member 3 is positioned in the open position, the upper open section 2*i* is closed by the cover 6, and the engagement recess 2*j* is blocked with respect to the outside by the cover 6. Accordingly, the opening/closing member 3 is not necessarily required.

Figure 10:
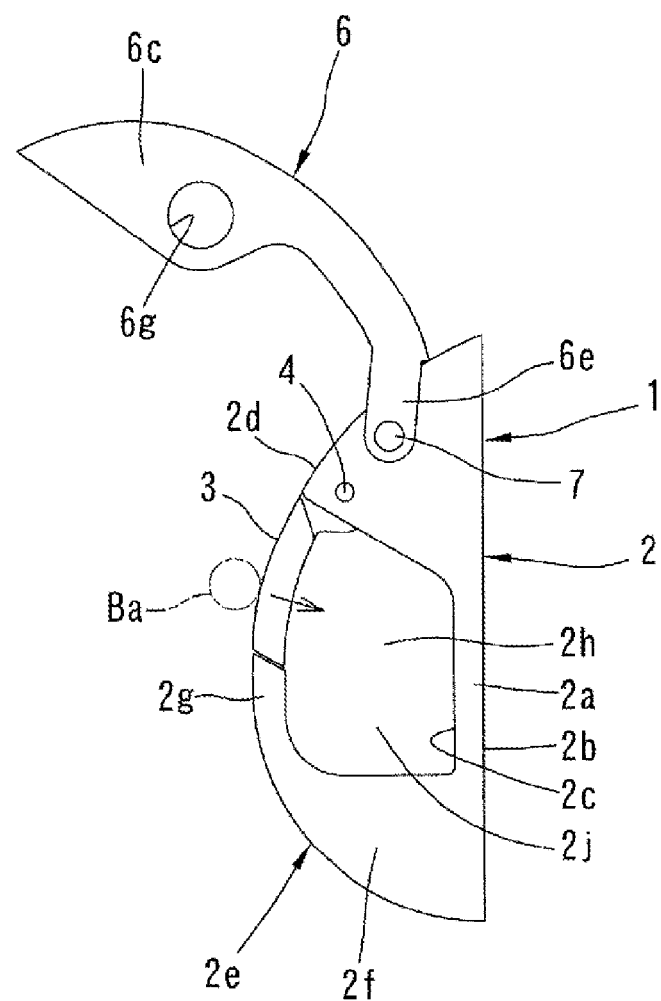
FIG. 10 is a view from the arrow Z of FIG. 7.
Figure 11:
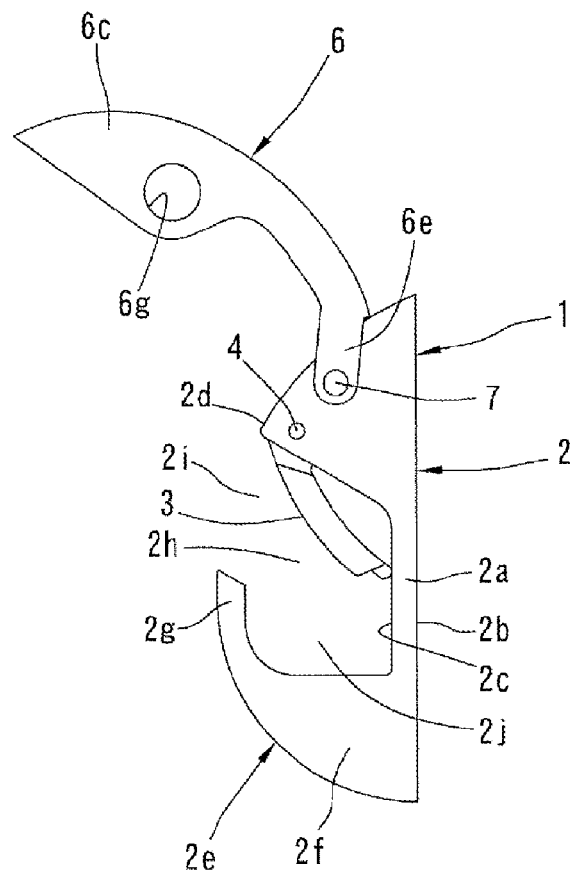
FIG. 11 a diagram similar to FIG. 10 showing a state in which the cover is positioned in the opened position, and the opening/closing member is positioned in the open position.

When the cover 6 is rotated from the closed position to a prescribed position in the clockwise direction (hereinafter, "opening direction") of FIG. 2, as shown in FIG. 10, an upper end of the circular arc-shaped plate part 6*b* (upper end when positioned in the closed position) abuts the front surface of the hanger body 2, and the cover 6 is unable to rotate any further in this direction. The rotation position of the cover 6 at this time is the opened position.

As shown in FIG. 10, when the cover 6 is in a state of being positioned in the opened position, the entire cover 6 is separated upward from the hook 2*e* and the opening/closing member 3. Accordingly, when the opening/closing member 3 is rotated from the blocking position shown in FIG. 10 to the open position shown in FIG. 11, the upper open section 2*i* is opened. As a result, a strap portion Ba of a handbag B (see FIG. 13) that has been inserted into the engagement recess 2*j* and is supported by the hook 2*e* can be removed from the engagement recess 2*j* through the upper open section 2*i*.

Figure 12:
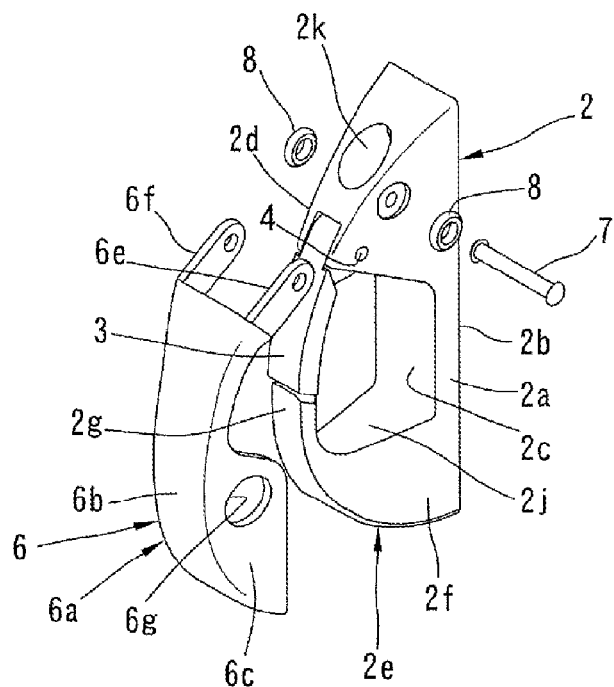
FIG. 12 is an exploded perspective view of the first embodiment of the present invention.

As shown in FIG. 12, an annular friction member 8 is fitted onto both end parts of the shaft 7 protruding in the right-left direction from the hanger body 2. The friction member 8 thereof is made from rubber or another resin, and in the present embodiment, an O-ring is adopted. One of the surfaces of the friction member 8 in the axial direction thereof is pressed against and contacts the hanger body 2, and the other surface thereof is pressed against and contacts the connection arm unit 6*e* (6*f*) of the cover 6. Moreover, through a frictional resistance generated between the surfaces that are pressed and contacting, the cover 6 can be stopped at any position between the closed position and the opened position. Of course, the cover 6 can be rotated against this frictional resistance.

Insertion holes (insertion parts) 6*g* penetrating each of the side plate parts 6*c*, 6*d* in the right-left direction are formed respectively in the side plate parts 6*c*, 6*d*. Two insertion holes 6*g*, 6*g* are formed such that the mutual axial lines coincide, and as shown in FIG. 4, when the cover 6 is positioned in the closed position, the insertion holes 6*g* are disposed such that they face the engagement recess 2*j* in the right-left direction. Accordingly, as shown in FIG. 13, a latch Ja of a padlock (lock) J can be inserted from one of the insertion holes 6*g* and through the other insertion hole 6*g*, thereby intersecting the engagement recess 2*j* in the right-left direction.

When the cover 6 is positioned in the closed position, a portion of the inner peripheral surface of the insertion hole 6*g* that is positioned furthest to the outside is arranged such that it nearly contacts the inner surface of the engagement part 2*g* facing the engagement recess 2*j*, or in other words, the back surface of the engagement part 2*g*. Accordingly, as is clear from FIG. 4, when the latch Ja is inserted through the insertion hole 6*g*, the cover 6 can rotate in the opening direction only by an amount of the difference between the diameters of the insertion hole 6*g* and the latch Ja, and is maintained in the closed position such that it cannot rotate for the most part.

Figure 13:
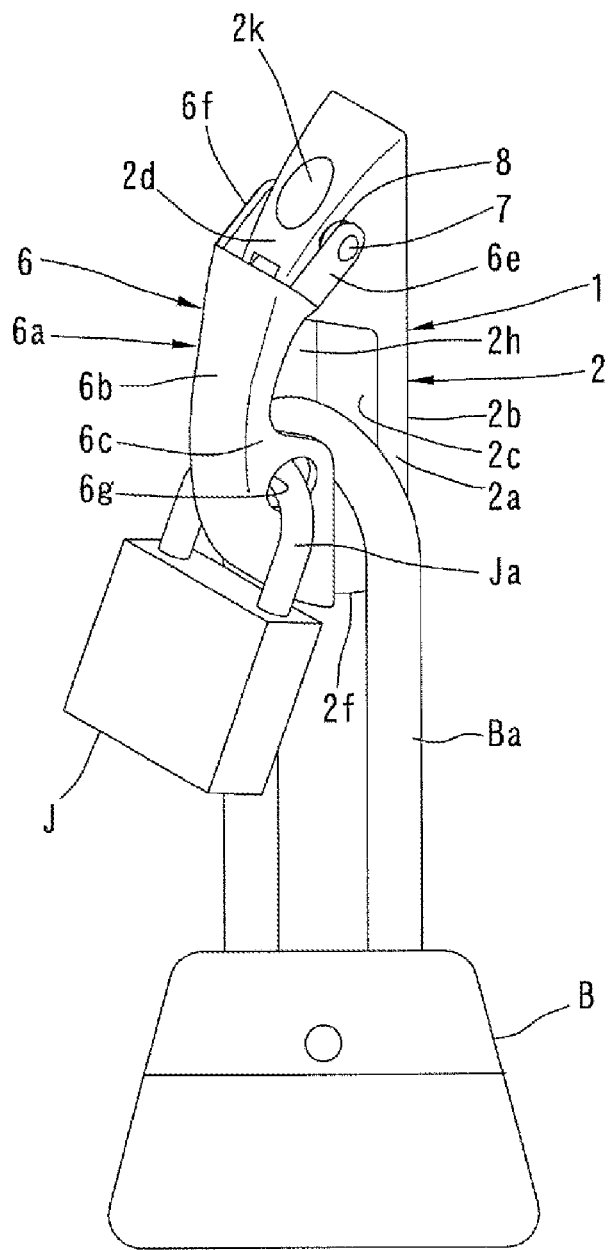
FIG. 13 is a perspective view showing a usage state of the first embodiment of the present invention.
Figure 14:
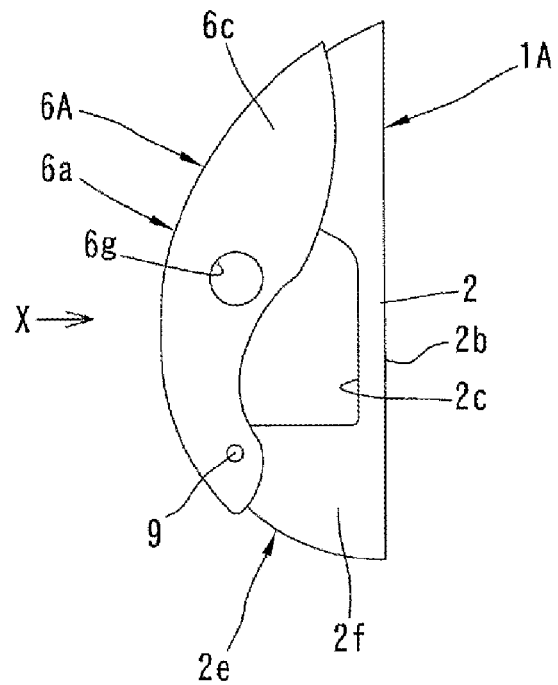
FIG. 14 is a side view showing a second embodiment of the present invention in a state with the cover positioned in the closed position.
Figure 15:
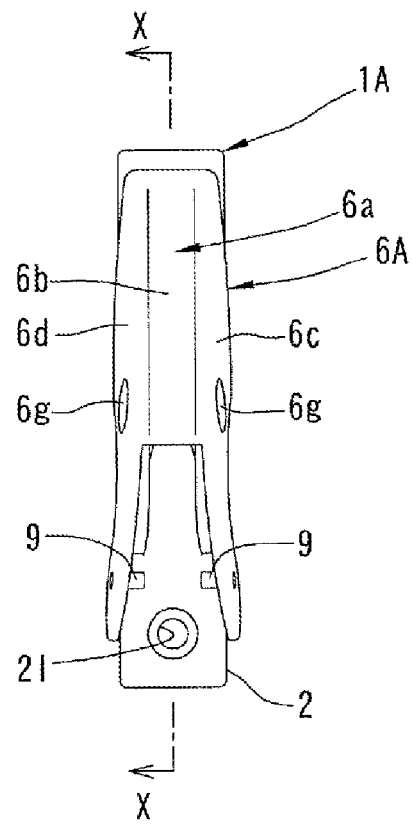
FIG. 15 is a view from the arrow X of FIG. 14.
Figure 16:
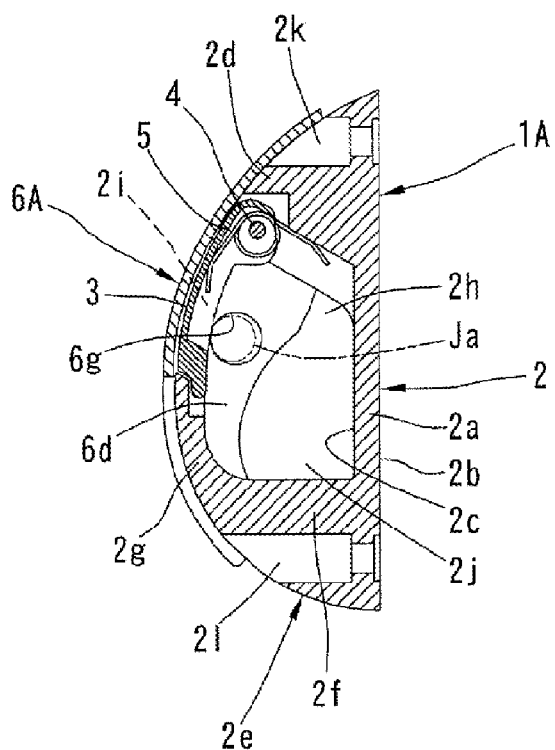
FIG. 16 is a cross-sectional view along the line X-X of FIG. 15.
Figure 17:
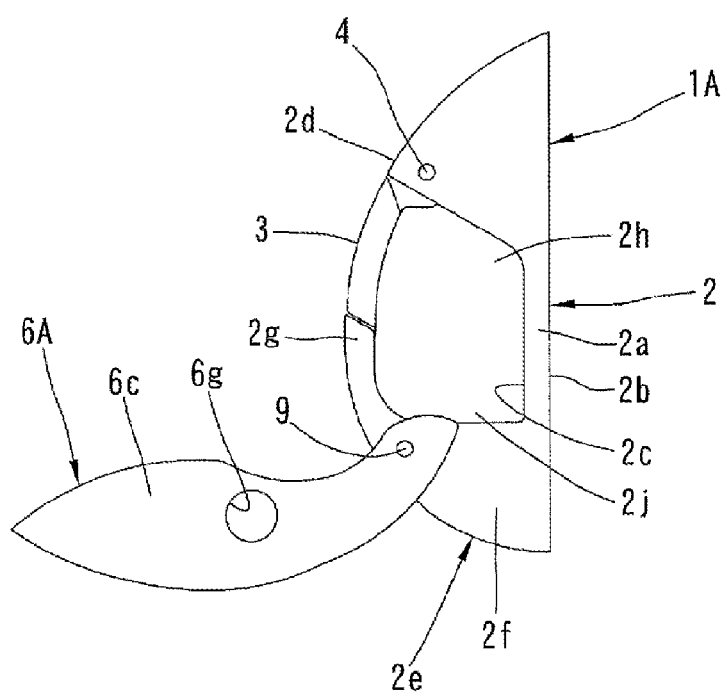
FIG. 17 is a side view showing the second embodiment of the present invention in a state with the cover positioned in the opened position.
Figure 18:
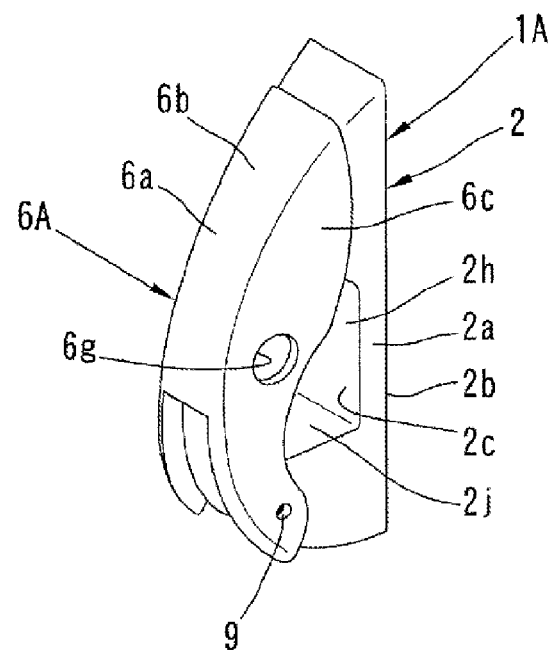
FIG. 18 is a perspective view showing the second embodiment of the present invention in a state with the cover positioned in the closed position.
Figure 19:
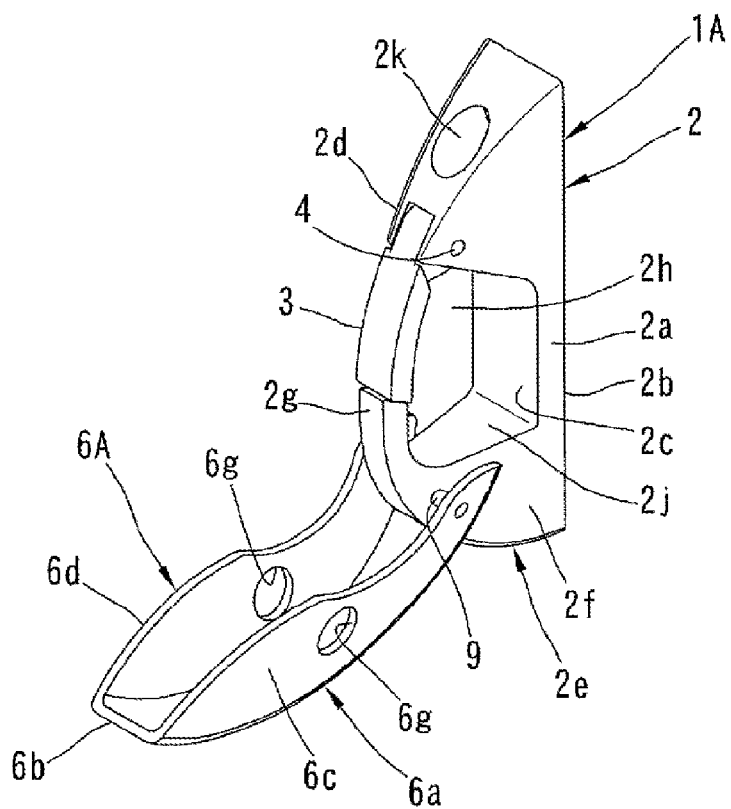
FIG. 19 is a perspective view showing the second embodiment of the present invention in a state with the cover positioned in the opened position.

If an article hanger 1 having the above-described configuration is used to suspend, for example, a handbag B shown in FIG. 13, as shown in FIG. 10, first the cover 6 is caused to be positioned in the opened position. Next, the strap portion Ba of the handbag B is abutted against the front surface of the opening/closing member 3 positioned in the blocking position. The opening/closing member 3 is then pushed rearward, and caused to rotate in the opening direction, thereby opening the upper open section 2*i*. Next, the strap portion Ba is moved downward and inserted into the engagement recess 2*j*. When the strap portion Ba moves downward and separates from the opening/closing member 3, the opening/closing member 3 is caused to rotate to the blocking position by the torsion coil spring 5. The strap portion Ba is caused to move further downward and is supported by the support part 2*f*. Through this, the handbag B is suspended by the article hanger 1. The opening/closing member 3 may also be opened with one hand without using the strap portion Ba to push open the opening/closing member 3, and then the strap portion Ba may be inserted into the engagement recess 2*j* from the upper open section 2*i* using the other hand.

Next, the cover 6 is rotated from the opened position to the closed position. At this time, the upper open section 2*i* is closed by the opening/closing member 3, and thus while the cover 6 is rotated from the opened position to the closed position, the strap portion Ba is prevented from being pulled out from the engagement recess 2*j* due to some unforeseen accident.

When the cover 6 is rotated to the closed position, the latch Ja of the padlock J is inserted through one of the insertion holes 6*g*, through the engagement recess 2*j*, and then through the other insertion hole 6*g* in that order. The padlock J is then locked. When an attempt is made in the locked state to rotate the cover 6 from the closed position to the opened position side, the latch Ja abuts the back surface of the engagement part 2g of the hook 2e, and through this, the cover 6 is maintained at the closed position. Accordingly, even if the opening/closing member 3 is moved from the blocking position to the open position, the upper open section 2g is maintained in a closed state by the cover 6. Hence, the strap portion Ba is prevented from being removed from the engagement recess 2j to the outside, and a situation such as theft of the handbag B can be reliably prevented.

Note that in place of the padlock J, another lock having a latch may also be used. Moreover, the latch does not necessarily have to be a rigid body, and as long as it has a prescribed amount of strength, it may be a latch having some flexibility such as a wire rope covered with a cylindrical body made of resin.

To remove the handbag B from the article hanger 1, first the padlock J is unlocked. Next, the latch Ja is pulled out from one of the insertion holes 6g, the engagement recess 2j, and then the other insertion hole 6g in that order, after which the cover 6 is rotated from the closed position to the opened position. Next, the opening/closing member 3 is rotated from the blocking position to the open position, thereby opening the upper open section 2i. The strap portion Ba is then extracted from the engagement recess 2j to the outside through the upper open section 2i. In this manner, the handbag B can be removed from the article hanger 1.

Next, another embodiment of the present invention is described. Note that only those constituent features that differ from the above-described embodiment are described for the embodiments described below. Structural portions that are similar to the above-described embodiments are assigned the same reference numerals, and a description thereof is omitted.

FIGS. 14 to 19 show a second embodiment of the present invention. With an article hanger 1A of this embodiment, a cover (anti-theft member) 6A is used instead of a cover 6. A lower end of the cover 6A is attached to the hanger body 2 such that the cover 6A is rotatable in the vertical direction. In other words, the lower ends of the side plate parts 6c, 6d of the cover 6A when positioned at the closed position are supported at a tip end part of the support part 2f of the hook 2e so as to be rotatable via horizontal shafts 9, 9 extending in the right-left direction. However, instead of the shafts 9, 9, a shaft passing through the hanger body 2 in the right-left direction may be used, and the side plate parts 6c, 6d may be respectively connected to both ends of the shaft thereof.

In this manner, the lower end of the cover 6A is supported so as to be rotatable at the lower end of the hanger body 2, and the end supported by the hanger body 2 is opposite that of the cover 6 of the above-described embodiment. However, when the cover 6A is positioned in the closed position, similar to the above-described embodiment, the engagement part 2g of the hook 2e and the opening/closing member 3 are covered.

Moreover, when the cover 6A is positioned in the closed position, a portion of the inner peripheral surface of the insertion hole 6g that is positioned furthest forward is arranged such that it contacts the back surface of the opening/closing member 3 positioned in the blocking position, and such that it opposes in the right-left direction a portion of the recess 2h that is positioned further upward than the engagement recess 2j. Accordingly, when an attempt is made to rotate the cover 6A positioned at the closed position shown in FIG. 16 to the opened position shown in FIG. 17, the latch Ja inserted through the insertion holes 6g, 6g and through the recess 2h abuts the opening/closing member 3 positioned at the blocking position, and pushes the opening/closing member 3 in the closing direction (counterclockwise direction in FIG. 16).

However, rotation of the opening/closing member 3 positioned at the blocking position further in the closing direction is deterred by the hook 2e. Accordingly, the cover 6A does not rotate fro, the closed position to the opened position, and is maintained at the closed position.

In this manner, with an article hanger 1A of the present embodiment, the latch Ja abuts the hanger body 2 via the opening/closing member 3 without directly abutting the hanger body 2. As is clear from this, in the present invention, the feature of the "latch inserted through the insertion hole abutting the hanger body" includes of course a case in which the latch Ja directly abuts the hanger body 2 as well as a case in which the latch abuts the hanger body 2 via another member such as the opening/closing member 3.

FIGS. 20 to 23 show a third embodiment of the present invention. With an article hanger 1B of this embodiment, the hanger body 2 has a main body part 2A and a base 2B. The main body part 2A is configured similar to the hanger body 2 of the above-described first embodiment with the exception that the cover 6 is not provided. Accordingly, the main body part 2A has a mounting plate 2a, a projection 2d, and a hook 2e, and an opening/closing member 3 is provided at the tip end part of the projection 2d.

On the other hand, the base 2B forms a flat plate shape, and is pressed against a back surface 2b of the main body part 2A. Screw insertion holes 2m, 2n are respectively formed at both vertical ends of the base 2B. The screw insertion holes 2m, 2n are respectively arranged such that axial lines thereof coincide with screw insertion holes 2k, 2l. Moreover, wood screws are inserted respectively into the screw insertion holes 2k, 2m and the screw insertion holes 2l, 2n, and each wood screw is screwed and fastened into a wall or such to press and secure the main body part 2A and the base 2B to a wall or such of a building frame. The base 2B and the main body part 2A may also be secured using mutually different securing means. In other words, the base 2B may be secured to a wall by one securing means, and the main body part 2A may be secured to the base 2B by a different securing means.

Figure 21:
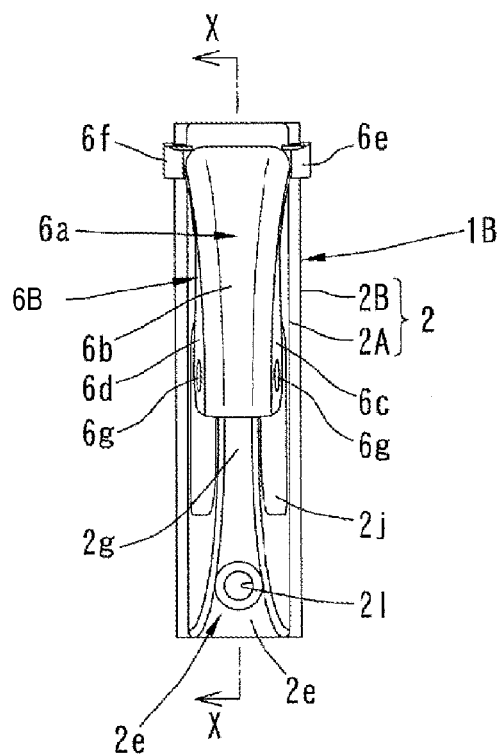
FIG. 21 is a view from the arrow X of FIG. 20.
Figure 23:
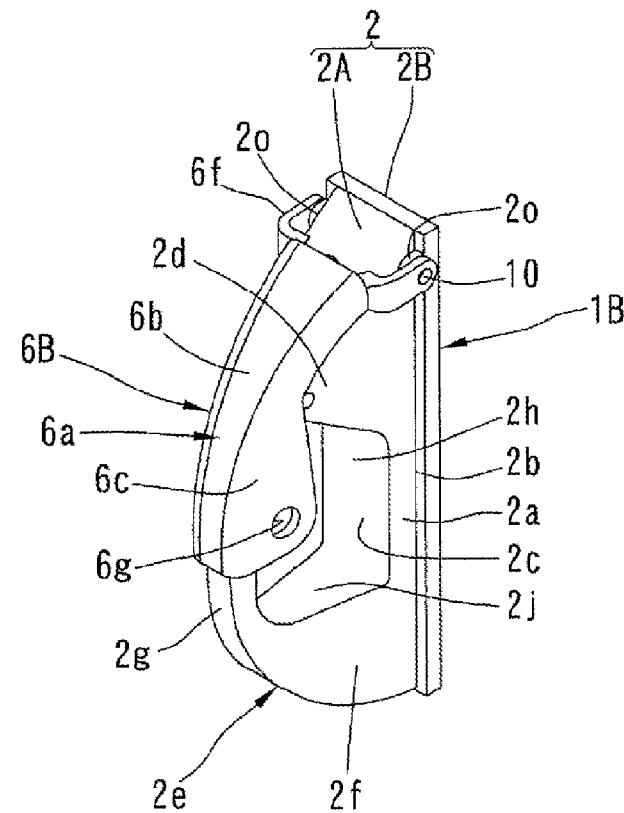
FIG. 23 is a perspective view of the third embodiment of the present invention in a state with the cover positioned in the closed position.
Figure 24:
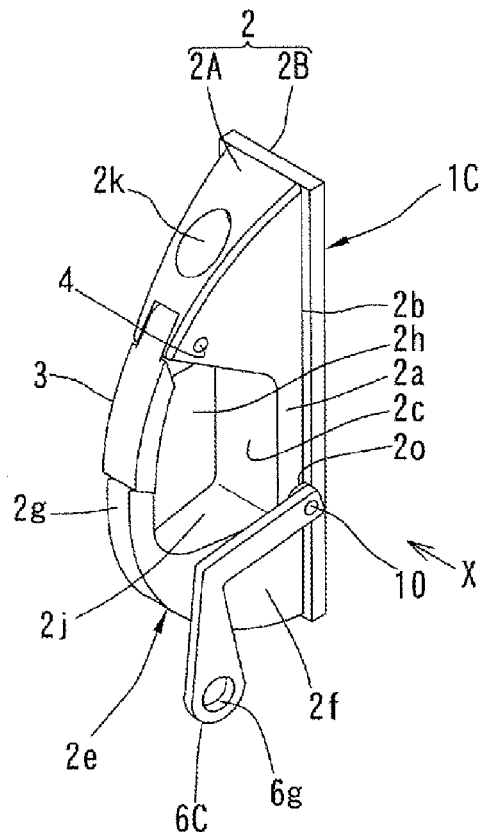
FIG. 24 is a perspective view showing a fourth embodiment of the present invention in a state with the cover positioned in a standby position.
Figure 25:
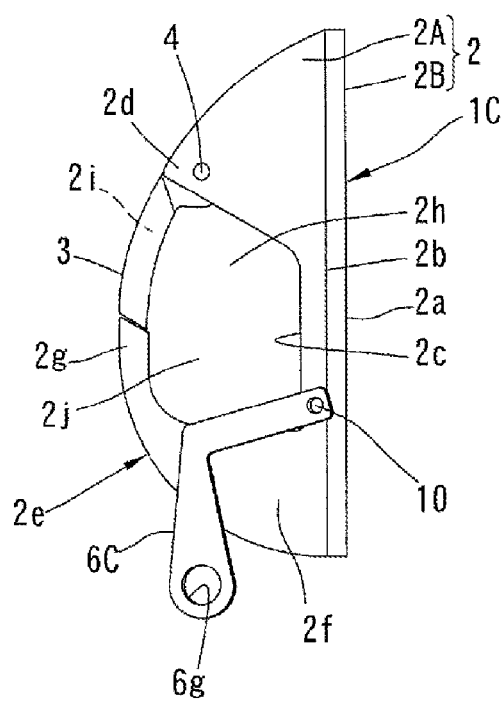
FIG. 25 is a view from the arrow X of FIG. 24.

As shown in FIG. 21 and FIG. 23, a width in the right-left direction of the base 2B is wider than a width in the right-left direction of the main body part 2A, and both side parts of the base 2B in the right-left direction project respectively from the main body part 2A in the right-left direction. Projections 2o, 2o that project forward are respectively formed at both side parts of the base 2B, the side parts thereof projecting in the right-left direction from the main body part 2A. Upper ends of connection arm units 6e, 6f of a cover 6B, which is used in place of the cover 6, are connected so as to be rotatable to the projections 2o, 2o thereof via horizontal shafts 10, 10 that extend in the right-left direction.

Figure 20:
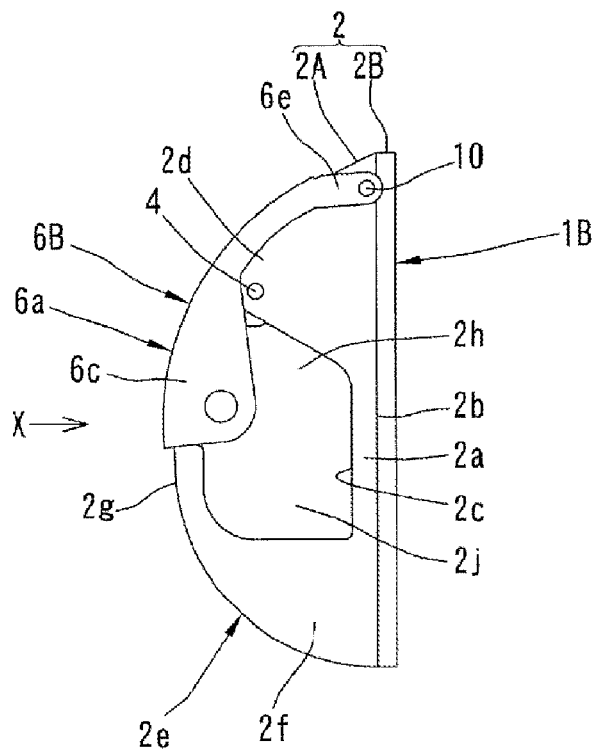
FIG. 20 is a side view showing a third invention of the present invention in a state with the cover positioned in the closed position.

The cover 6B is capable of rotating between a closed position shown in FIGS. 20 to 23 and an opened position at which the cover 6B is rotated in the counterclockwise direction of FIG. 20 by a prescribed angle from the closed position thereof. When the cover 6B is positioned in the opened position, the hook 2e, the opening/closing member 3, and the upper open section 2i are exposed to the outside. This feature is similar to the cover 6 of the above-described first embodiment. However, the vertical length of the cover 6B of this embodiment is shorter than that of the cover 6 of the above-described first embodiment, and a lower end of the circular arc-shaped plate part 6b of the cover 6B is such that it abuts only the upper end of the engagement part 2g of the hook 2e. Accordingly, when the cover 6B is positioned in the closed position, only the opening/closing member 3, the upper open section 2i, and the upper end of the engagement 2g are shielded by the cover 6B, and a large portion of the lower side of the engagement part 2g is exposed to the outside.

Figure 22:
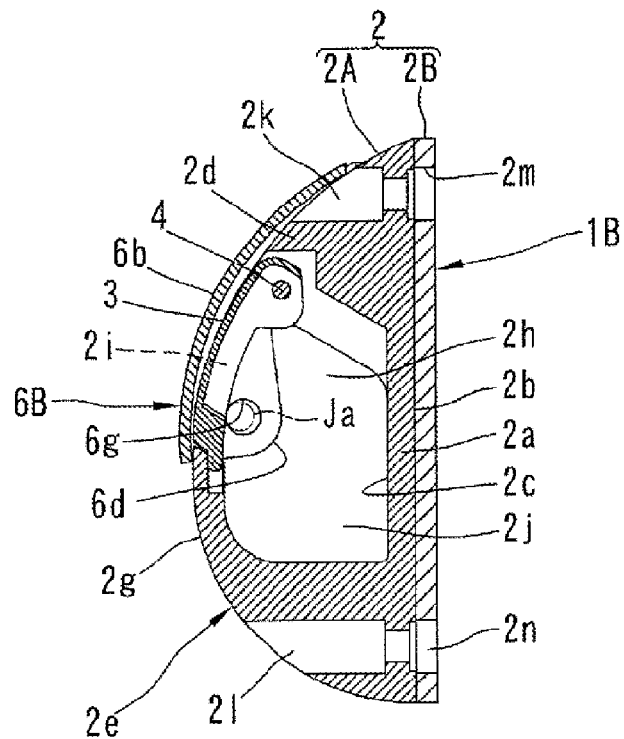
FIG. 22 is a cross-sectional view along the line X-X of FIG. 21.

Moreover, because the length of the cover 6B is short, as shown in FIG. 22, the insertion hole 6g is arranged such that it contacts the back surface of the opening/closing member 3 positioned in the blocking position. Accordingly, with this embodiment as well, the latch Ja inserted through the insertion holes 6g, 6g and the recess 2h abuts the main body part 2A, which is part of the hanger body 2, via the opening/closing member 3 positioned in the blocking position, and through this, rotation of the cover 6B from the closed position to the opened position side is prevented.

FIGS. 24 to 27 illustrate a fourth embodiment of the present invention. An article hanger 1C of this embodiment is a modification of the article hanger 1B of the above-described third embodiment, and only a single projection 20 is formed in the base 2B. The projection 20 is arranged slightly lower from the center of the base 2B in the vertical direction such that it is positioned at nearly the same position in the vertical direction as the lower end of the engagement recess 2j.

Figure 26:
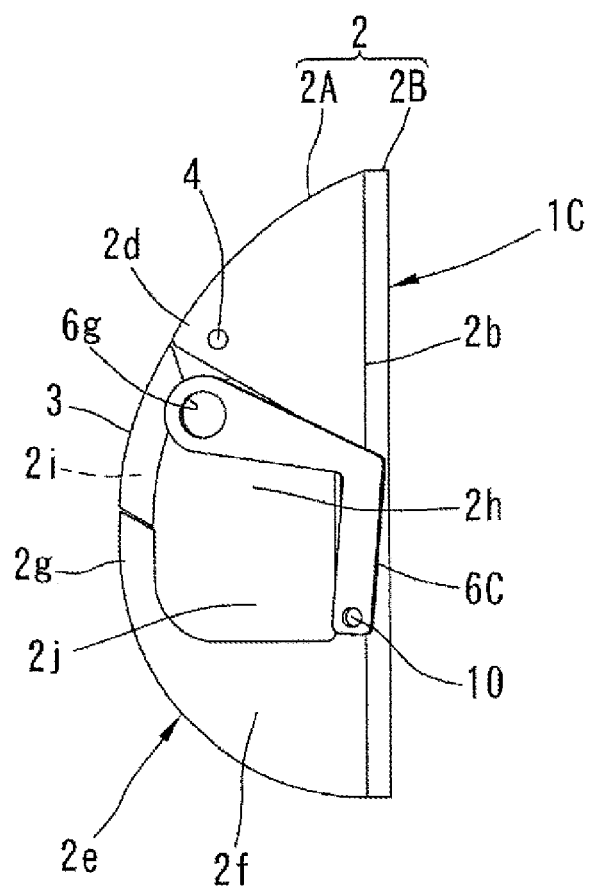
FIG. 26 is a perspective view showing the fourth embodiment of the present invention in a state with the cover positioned in the opened position.

Moreover, with this embodiment, an anti-theft member 6C is used in place of the cover 6. The anti-theft member 6C is arranged such that it nearly contacts one side part (the right side part in FIG. 25) in the right-left direction of the hanger body 2. One end part of the anti-theft member 6C is connected to the projection 20 so as to be rotatable via a horizontal shaft 10 extending in the right-left direction. The anti-theft member 6C is capable of rotating between a standby position shown in FIG. 24 and FIG. 25, and an opened position for which the anti-theft member 6C is rotated by only a prescribed angle in the clockwise direction from the standby position thereof as shown in FIG. 26, and a position between the standby position and the opened position as shown in FIG. 27 is a closed position.

Figure 27:
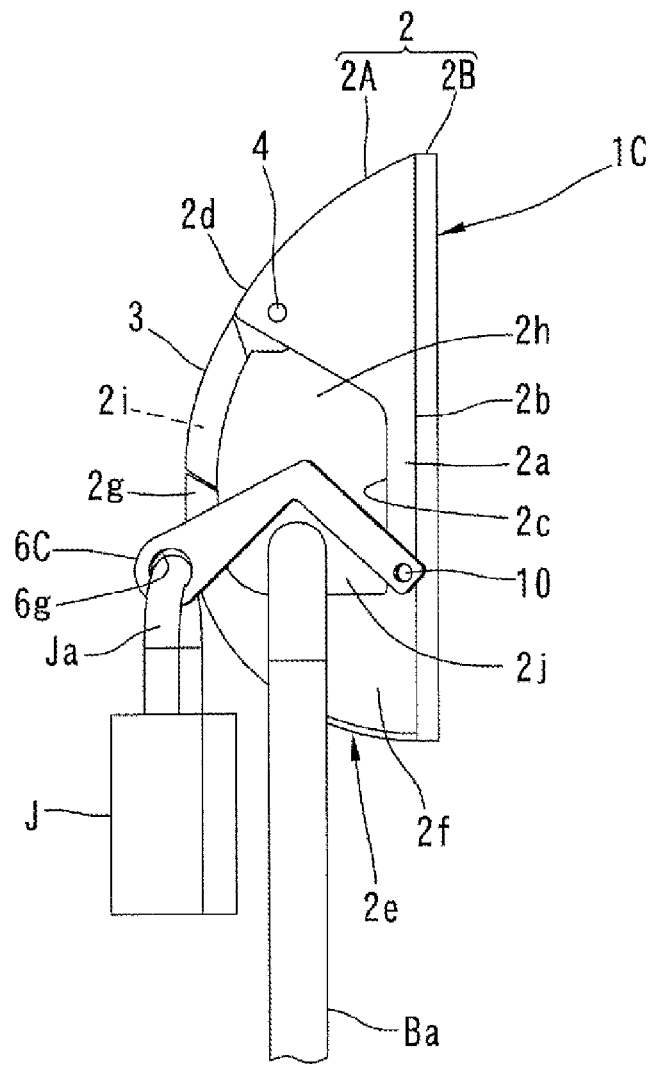
FIG. 27 is a side view showing the fourth embodiment in a usage state.
Figure 28:
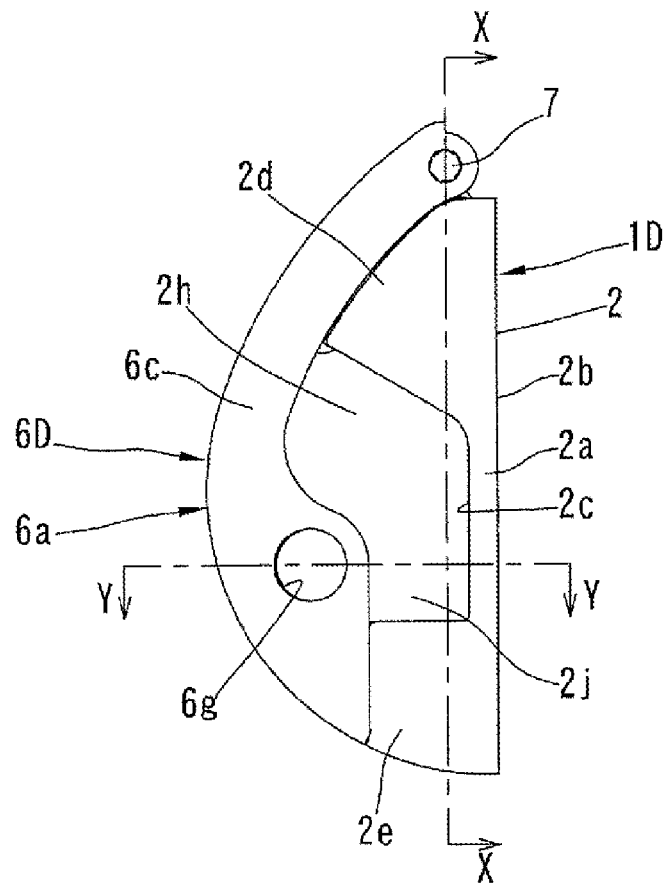
FIG. 28 is a side view showing a fifth embodiment of the present invention in a state with the cover positioned in the closed position.
Figure 29:
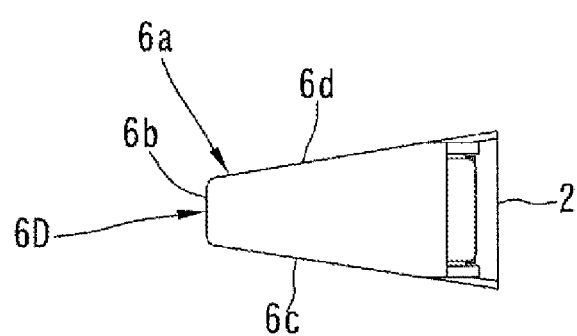
FIG. 29 is a plan view of the fifth embodiment of the present invention.
Figure 30:
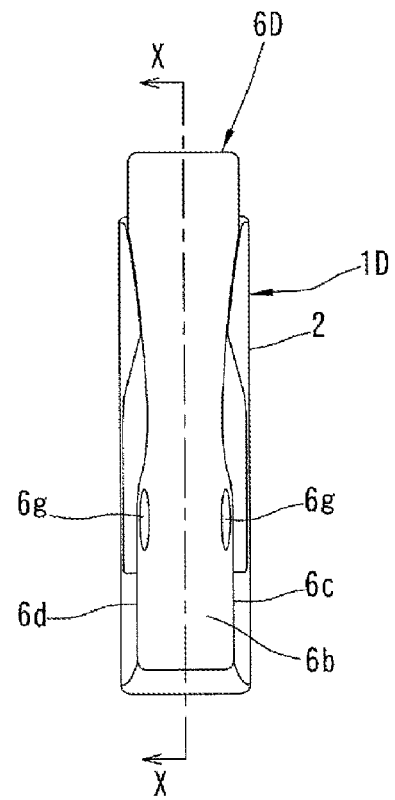
FIG. 30 is a front view of the fifth embodiment of the present invention.
Figure 31:
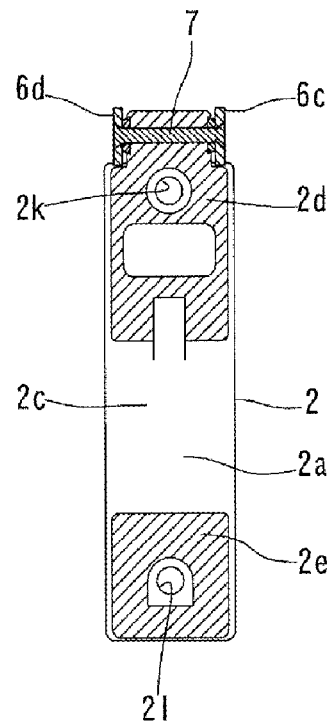
FIG. 31 is a cross-sectional view along the line X-X of FIG. 28.
Figure 32:
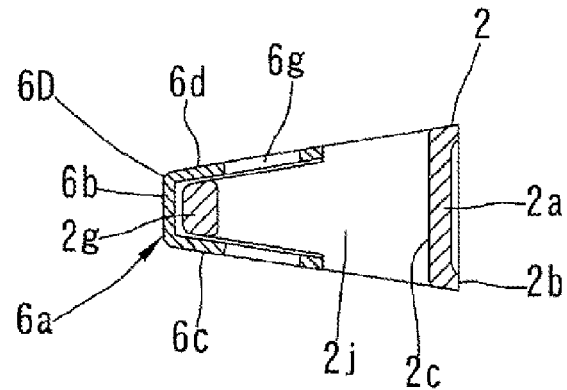
FIG. 32 is a cross-sectional view along the line Y-Y of FIG. 28.

The anti-theft member 6C forms a roughly right-angled ("L") shape, and as shown in FIG. 27, when the anti-theft member 6C is positioned in the closed position, one end portion thereof (the right end portion in FIG. 27) is positioned at nearly the same position in the vertical direction as the other end portion, and a center part thereof is positioned further upward than the two end portions. Moreover, the center part of the anti-theft member 6C is also positioned further upward than the bottom face of the engagement recess 2j. Accordingly, when the anti-theft member 6C is positioned in the closed position, a space between the engagement recess 2j and the upper open section 2i is blocked when viewed from the side. In the present invention, the term "closed" also includes this type of blocked state. As a result of the space between the engagement recess 2j and the upper open section 2i being blocked by the anti-theft member 6C, movement in the upward direction of a strap portion Ba or the like inserted through the engagement recess 2j is prevented by the anti-theft member 6C. Hence, the strap portion Ba cannot be extracted to the outside from the upper open section 2i.

When the anti-theft member 6C is positioned in the closed position as shown in FIG. 27, the other end portion thereof (the left end portion in FIG. 27) is positioned further forward than the engagement part 2g of the hook 2e, and an insertion hole 6g is formed in the other end portion thereof. Of the inner peripheral surface of the insertion hole 6g, a portion thereof that is positioned furthest to the rearward side is arranged such that it contact the front surface of the engagement part 2g. Accordingly, when an attempt is made to rotate the anti-theft member 6C positioned in the closed position from the closed position to the opened position side, the latch Ja abuts the front surface of the engagement part 2g. Through this, rotation of the anti-theft member 6C from the closed position to the opened position is prevented.

To suspend a strap portion Ba of a handbag B from the article hanger 1C having the above-described configuration, first the anti-theft member 6C is rotated from the standby position to the opened position. Next, the strap portion Ba is used to push on and open the opening/closing member 3, and the strap portion Ba is inserted into the engagement recess 2j, and is supported by the support part 2f. In this state, the opening/closing member 3 is returned to the closed position by the torsion coil spring 5 (see FIG. 4), thereby closing the upper open section 2i. Next, the anti-theft member 6C is rotated in the closed direction from the opened position. When the center part of the anti-theft member 6C abuts the strap portion Ba, the anti-theft member 6C is unable to rotate any further in the closing direction and stops. The position at this time of the anti-theft member 6C is the closed position. When the anti-theft member 6C is positioned in the closed position, the strap portion Ba is surrounded by the hook 2e and the anti-theft member 6C. As a result, the strap portion Ba is unable to move upward from the engagement recess 2j, and cannot be extracted from the upper open section 2i to the outside. Next, the latch Ja is inserted into the insertion hole 6g, and the padlock J is locked. When this is done, the anti-theft member 6C cannot be rotated from the closed position to the opened position side. Accordingly, the strap portion Ba cannot be removed from the engagement recess 2j. Thus, theft of the handbag B can be reliably prevented.

To remove the strap portion Ba of the handbag B from the article hanger 1C, first, the padlock J is unlocked. Next, the latch Ja is extracted from the insertion hole 6g, and then the anti-theft member 6C is rotated from the closed position to the opened position. Next, the opening/closing member 3 is rotated from the blocking position to the open position, after which the strap portion Ba is removed through the upper open section 2i to the outside. Through this, the handbag B can be removed from the article hanger 1C. After the handbag is removed, the anti-theft member 6C is rotated to the standby position, and is thereby returned to the original state shown in FIG. 24 and FIG. 25.

FIG. 28 to FIG. 34 show a fifth embodiment of the present invention. An article hanger 1D of this embodiment is a modification of the article hanger 1B of the above-described third embodiment, and in place of the cover 6B, a cover (anti-theft member) 6D is used. When the cover 6D is positioned in the closed position, both side plate parts 6c, 6d of the cover 6D extend beyond the screw insertion hole 2k of the upper side to the upper end of the hanger body 2. Moreover, upper ends of the side plate parts 6c, 6d (one end part of the cover 6D) are attached to the upper end of the hanger body 2 so as to be rotatable via a shaft 7. The circular arc-shaped plate part 6b of the cover 6D also extends beyond the screw insertion hole 2k to the upper end of the hanger body 2.

Figure 33:
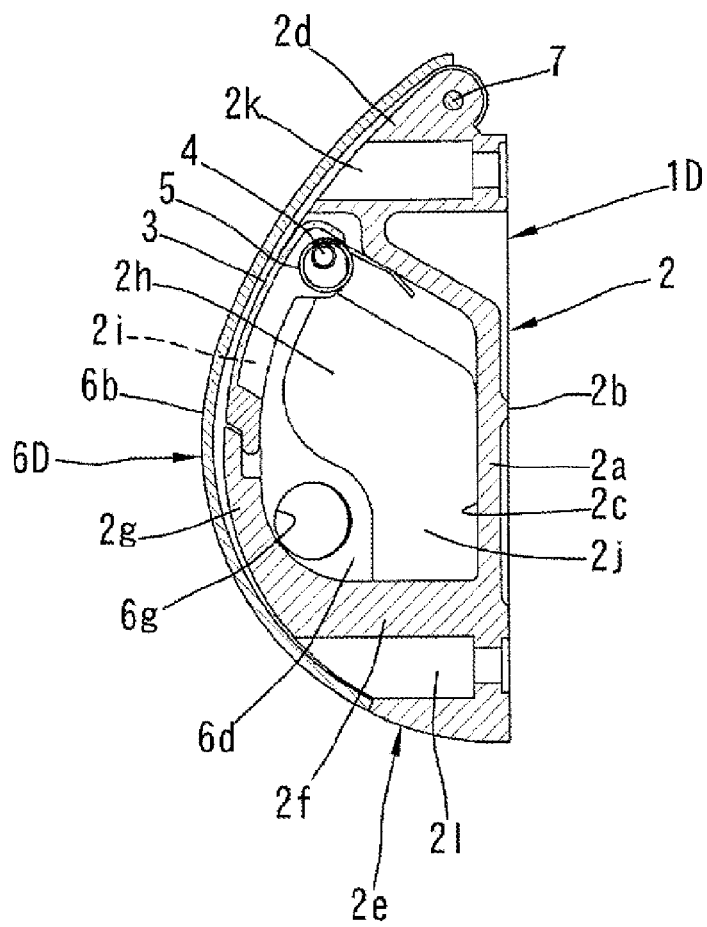
FIG. 33 is a cross-sectional view along the line X-X of FIG. 30.
Figure 34:
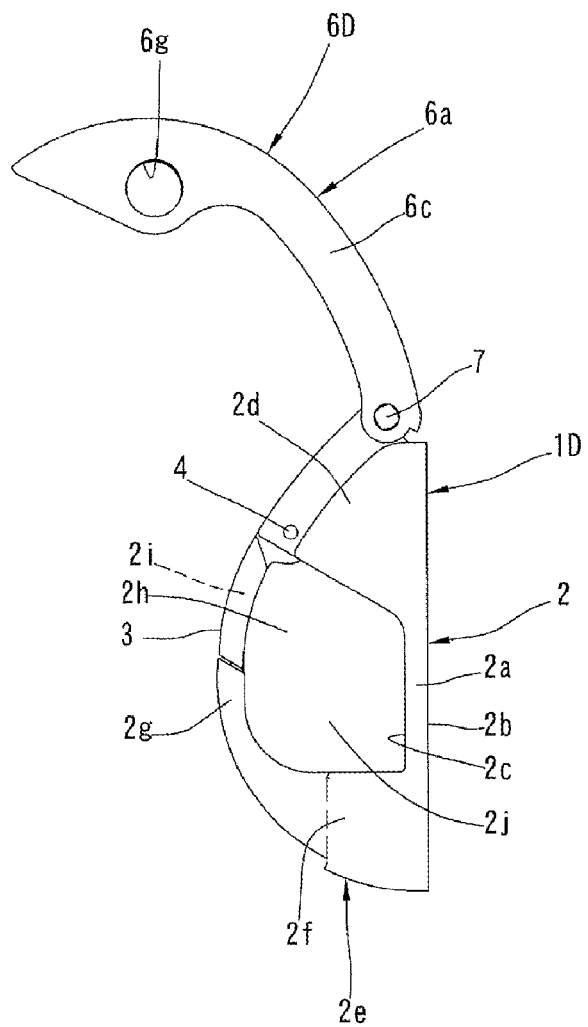
FIG. 34 is a side view showing the fifth embodiment of the present invention in a state with the cover in the opened position.

Accordingly, as shown in FIG. 33, when the cover 6D is rotated to the closed position, the screw insertion hole 2k of the upper side is covered by the cover 6D. Similar to the above-described first embodiment, the lower side screw insertion hole 21 is covered by a lower end of the cover 6D (the other end portion). As a result, when the cover 6D is positioned in the closed position, the screw insertion holes 2k, 21 are covered by the cover 6D, and thus wood screws, bolts, or the like inserted into the screw insertion holes 2k, 21 cannot be removed. Hence, situations such as the article hanger 1D being removed from a wall or the like, and a handbag B or another article being stolen together with the article hanger 1D can be reliably prevented. Only one of either the screw insertion holes 2k, 2l may also be formed, or three or more screw insertion holes may be formed.

Note that the present invention is not limited to the above-described embodiments, and various modifications can be adopted within a scope that does not depart from the gist thereof. For example, in the above-described embodiments, the upper open section 2i is configured such that is it opened and closed by the opening/closing member 3, but the opening/closing member 3 does not necessarily have to be provided because when the cover 6, 6A, 6B, or 6D is positioned in the closed position, the upper open section 2i is closed by the cover 6, 6A, 6B, or 6D, or the space between the engagement recess 2j and the upper open section 2i is blocked by the anti-theft member 6C.

Moreover, with the above-described embodiments, a projection 2d is formed at an upper part of the front surface 2c of the mounting plate 2a, but the projection 2d does not necessarily have to be provided. In this case, the engagement recess 2j is opened in the upward direction. Moreover, the upper end of the opening/closing member is provided so as to be rotatable at the upper end of the mounting plate 2a.

Furthermore, with the above-described embodiments, an insertion hole 6g is formed as an insertion hole through which the latch Ja is inserted, but instead of an insertion hole 6g, an insertion groove may be formed. In this case, the insertion groove is formed with a configuration that intersects the cover 6 (6A, 6B, 6C, 6D) in the right-left direction such that the latch Ja can be inserted. Moreover, the insertion groove opens upward or downward, and is configured such that both side parts of the front and back are closed. Further, when the cover 6 (6A, 6B, 6C, 6D) is positioned in the closed position, in order to prevent removal from the open part of the upper side or lower side of the insertion groove of a latch Ja that has been inserted through the insertion groove, the insertion groove is arranged such that the open part of upper side or lower side of the insertion groove is closed by the hanger body 2 (2A).

While the principles of the disclosure have been described above in connection with specific apparatuses, it is to be clearly understood that this description is made only by way of example and not as limitation on the scope of the invention.

The invention claimed is:

1. An article hanger provided with a hanger body attachable to a building frame; a hook provided as a portion of the hanger body in a front surface of the hanger body, the hook having an upper end separated in a forward direction from the front surface of the hanger body; an engagement recess formed by the hook and the front surface of the hanger body, the engagement recess having a lower portion that is closed, and both right and left side parts that are opened; and an upper open section which opens an upper portion of the engagement recess to an outside, the upper open section being formed above the upper end of the hook, the article hanger comprising:
an anti-theft member having one end provided at the hanger body so as to be rotatable around an axial line of rotation, the anti-theft member being capable of rotating between a closed position, where the engagement recess is closed with respect to the outside, and an opened position, where the engagement recess is opened to the outside via the upper open section; and
an insertion hole into which a latch of a padlock is inserted, the insertion hole being formed on the anti-theft member, and the insertion hole being arranged such that rotation of the anti-theft member from the closed position to the opened position side is prevented by the inserted latch abutting the hanger body.

2. The article hanger according to claim 1, wherein one end in a vertical direction of the anti-theft member is provided so as to be rotatable at the hanger body, and
wherein when the anti-theft member is positioned in the closed position, the upper open section is closed, thereby closing the engagement recess with respect to the outside, and when the anti-theft member is positioned in the opened position, the upper open section is opened, thereby opening the engagement recess via the upper open section with respect to the outside via the upper open section.

3. The article hanger according to claim 2, wherein when the anti-theft member is positioned in the opened position, another end of the anti-theft member separates in a forward direction from the hanger body, thereby opening the upper open section, and when the anti-theft member rotates to the closed position such that the other end of the anti-theft member moves toward the hanger body, the anti-theft member covers the upper open section, thereby closing the upper open section.

4. The article hanger according to claim 3, wherein an upper end of the anti-theft member is rotatably provided at the hanger body such that a lower end of the anti-theft member moves approaching and separating in a front-back direction with respect to the hanger body.

5. The article hanger according to claim 4, wherein the insertion hole is arranged such that when an attempt is made to rotate the anti-theft member from the closed position to the opened position side, the latch inserted into the insertion hole abuts an inner surface facing the engagement recess of the hook, and rotation of the anti-theft member from the closed position to the opened position side is prevented by the latch abutting the inner surface facing the engagement recess of the hook.

6. The article hanger according to claim 2, further comprising an opening/closing member, an upper end of which is provided so as to be rotatable centered on a horizontal axial line at the hanger body,
wherein the opening/closing member is capable of rotating between a blocking position where a lower end of the opening/closing member abuts from a rear side of the upper end of the hook, thereby closing the upper open section, and an open position where the lower end separates rearward from the hook, thereby opening the upper open section, and a rotational biasing means for rotationally biasing the opening/closing member from the open position side to the blocking position side and maintaining the opening/closing member at the blocking position is provided between the hanger body and the opening/closing member.

7. The article hanger according to claim 5, the anti-theft member further comprising:
a main plate part opposing the upper open section and the hook in the front-back direction; and
a side plate part on at least one of both a right and a left side parts of the main plate, the side plate part projecting rearward so as to pass both a right and a left side part of the hook toward the rear when the anti-theft member is positioned at the closed position, a tip end part of the projection direction opposing the engagement recess in a right-left direction, and the insertion hole being formed at the tip end part of the side plate part.

8. The article hanger according to claim 7, further comprising an opening/closing member, an upper end of which is provided so as to be rotatable centered on a horizontal axial line at the hanger body, wherein the opening/closing member is capable of rotating between a blocking position where a lower end of the opening/closing member abuts from a rear side of the upper end of the hook, thereby closing the upper open section, and an open position where the lower end separates rearward from the hook, thereby opening the upper open section, and a rotational biasing means for rotationally biasing the opening/closing member from the open position side to the blocking position side and maintaining the opening/closing member at the blocking position is provided between the hanger body and the opening/closing member.

9. The article hanger according to claim 8, wherein the side plate parts are formed respectively on both right and left side parts of the main plate part, and when the anti-theft member is positioned in the closed position, the hook and the opening/closing member positioned in the blocking position are covered from the forward direction and from both the right and left sides by the main plate part and the side plate parts.

10. The article hanger according to claim 1, the hanger body further comprising a screw insertion hole for inserting a male screw member to secure the hanger body to the building frame, wherein the screw insertion hole is arranged such that when the anti-theft member is in the closed position, the screw insertion hole is shielded by the anti-theft member.

* * * * *